United States Patent Office 3,326,776
Patented June 20, 1967

3,326,776
STREPTOKINASE PREPARATIONS HAVING REDUCED ANTIGENICITY AND PROCESS FOR PREPARING THEM
Hermann E. Schultze, Marbach, near Marburg (Lahn), Hans Gerhard Schwick, Marburg (Lahn), and Norbert Heimburger, Marbach, near Marburg (Lahn), Germany, assignors to Behringwerke Aktiengesellschaft, Marburg (Lahn), Germany, a corporation of Germany
No Drawing. Filed June 23, 1964, Ser. No. 377,375
Claims priority, application Germany, June 29, 1963, B 72,486
7 Claims. (Cl. 195—62)

The present invention provides streptokinase preparations that have reduced antigenicity, but possess the full functional activity of the starting material; furthermore, the present invention provides a process for preparing such streptokinase preparations.

Strepotokinase is a biocatalyst which has proved highly active in the therapy of venous and arterial thromboses, thromboplebites and pulmonary embolisms. As it is known, streptokinase is produced by streptococci; for preparing it, a streptococci strain apathogenic to humans is used (cf. Christensen, L. R., J. Gen. Physiol., 28, 363, 1945).

Streptokinase has a slight antigenic activity; with a view to therapeutic use, however, it is desirable to annul this antigenicity or at least to reduce it. No process has been known hitherto which permits the reduction of the antigenicity of streptokinase.

Now, we have found that streptokinase preparations having reduced antigenicity can be prepared by treating streptokinase with proteolytic enzymes, separating in a known manner the formed streptokinase preparation from the obtained solution, and if desired or required, isolating it by freeze-drying.

According to the process of the present invention, a streptokinase which has been purified, for example, by one of the processes described in German Patents 1,115,888 and 1,133,505 is used as the starting material. The process of the present invention may also be applied to streptokinase-containing crude fractions, for example, the fractions obtained by alcohol fractionation. However, in order that the enzyme treated solution contains only the final product and unspecific streptokinase degradation products, which are separated from one another by known methods, it is of advantage to start from a purified streptokinase.

As proteolytic enzymes, there may be used, for example, pepsin, thrombin, papain or plasmin, preferably pepsin or thrombin. The enzymatic degradation process can be stopped in various ways. Pepsin is inactivated by adjustment of the pH of the solution to a neutral value. Thrombin, which is a very sensitive enzyme, is inactivated merely upon surface contact (J. Green, Biochem. J., 79, 13 p., 1961). It loses its activity to a large extent during the incubation with streptokinase. The remaining activity is destroyed during the chromatography which follows and the inactivated thrombin, together with the unspecific split product, is then separated from the final product. Enzymatic degradation may also be interrupted by undercooling to —20° C. or by chromatographic separation.

The process of the present invention is advantageously carried out by adding to a purified aqueous streptokinase solution a solution of one of the aforementioned enzymes which, if desired or required may also be buffered, and incubating the combined solution for a time at a temperature in the range from 10° to 40° C., preferably 15° to 37° C. The reaction period depends, of course, on the activity of the enzyme preparation used and the activity of the enzyme preparation depends on the pH-value of the reaction mixture. For a given enzyme, the reaction period can be shortened or lengthened by variation of the pH-value. In general, it is of advantage not to choose the optimum pH-value of the enzyme used. For the above-mentioned enzymes, the following pH-values are preferable used:

Pepsin—5.0 to 6.6, preferably 6.0
Thrombin—7.0 to 8.0, preferably 7.6
Papain—5.5 to 6.5, preferably 6.0
Plasmin—6.0 to 8.0, preferably 7.0

The reaction period ranges from about half an hour to 5 hours. For adjusting to the desired pH-value, it is expedient to dissolve the enzymes in a buffer solution, for example, a citrate or phosphate buffer, and to add this solution to the streptokinase solution. After the incubation, the streptokinase preparation which has formed is purified in a known manner, for example, by dialysis, alcohol precipitation, ammonium sulfate precipitation, chromatographic separation on DEAE-cellulose or on cross-linked dextran which is etherified with diethylaminoethyl (DEAE) groups, by the column or the batch process. If desired or required, the final product is isolated by freeze-drying.

The activity of the products of the present invention is expressed in Christensen units (cf. J. Clin. Invest., 28, (1949), 163). In starch gel electrophoresis and in immunoelectrophoresis, the product exhibits a higher migration speed than the starting material. The antigenicity is tested by the immuno-precipitation technique and by the passive anaphylaxis test in the skin. In comparison with the starting material, the immuno-precipitation reaction of the streptokinase treated in accordance with the invention is reduced by about 50% towards a specific antistreptokinase serum from a horse (quantitative immuno-precipiation according to Heidelberger and Kendall, J. exp. Med., 1935, 61, 563).

The preparation obtained by the process of the present invention is a new product, as regards its physical and chemical nature. It still has the functional activity of streptokinase, but it exhibits an antigenicity which, compared to that of the starting material, is distinctly reduced. Owing to this property, the product is superior to streptokinase and, therefore, particularly suitable for the therapeutic purposes set forth at the beginning.

The following examples illustrate the invention, but they are not intended to limit it thereto:

*Example 1.—Treatment with pepsin*

20 ml. of a 0.1 molar citrate buffer having a pH-value of 6.0 and 750 gamma of pepsin (crystallized twice) dissolved in 0.75 ml. of the citrate buffer having a pH-value of 6.0 were added to 15 ml. of a solution containing a total of 10,650,000 Christensen units of highly purified streptokinase; the whole was then incubated for 3 hours at 20° C. Enzymatic degradation was stopped by adjusting the pH-value to 7.2 by means of a 0.1 molar sodium hydroxide solution, the solution was dialyzed with distilled water having a pH-value of 7.2 and the resulting preparation was freeze-dried. The yield was 6,400,000 units equal to 60% of the quantity of streptokinase used.

Analysis by starch gel electrophoresis and immunoelectrophoresis of the streptokinase preparation obtained by the process of the above example showed the product to have a greater migration speed than the starting material.

*Example 2.—Treatment with thrombin*

16 ml. of a streptokinase solution containing 11,360,000

Christensen units of streptokinase were incubated at 37° C. and at a pH-value of 7.6 with 1500 units of thrombin dissolved in 0.4 ml. of a 0.85% sodium chloride solution having a pH-value of 7.6 and obtained by autocatalytic transformation in sodium citrate. After 4 hours, enzymatic degradation stopped. From the original coagulation activity of thrombin only about 20% could be determined. The yield was 7,724,800 units of streptokinase equal to 68% of the quantity used.

In starch gel electrophoresis and in immuno-electrophoresis the streptokinase preparation obtained by the treatment with thrombin moved distinctly faster than the starting material.

Two inactive split products, which were identified by reason of their lower migration speed, were separated from the active product by chromatography on crosslinked dextran etherified with diethylaminoethyl (DEAE) groups; the thrombin was thereby also removed.

For carrying out this separation, the exchanger was equilibrated with a 0.06 molar phosphate buffer and then covered with the enzyme solution. The exchanger was subsequently eluted with the same buffer, but to which had been added 0.2 mol of sodium chloride. All undesirable accompanying substances were thereby removed. By adding to the buffer 0.4 mol of sodium chloride, the active streptokinase preparation was subsequently eluted.

The streptokinase preparation produced by enzymatic degradation was then precipitated from the eluate by means of 40% alcohol, at a pH-value of 5.5, a specific electric conductivity of 5 ms./cm. and at a temperature in the range from 0° to —5° C.

In the passive anaphylaxis test in the skin of rabbits and guinea pigs, the streptokinase preparation obtained by treatment with thrombin provoked only a very weak positive reaction.

*Example 3.—Treatment with papain*

10 ml. of a 0.1 molar phosphate buffer having a pH-value of 6.1 and 0.1 ml. of a papain solution containing 100 gamma of crystalline papain dissolved in a phosphate buffer having a pH-value of 6.0 were added to 10 ml. of streptokinase solution containing a total of 5,000,000 Christensen units of streptokinase; the solution was incubated for 60 minutes at 37° C. After the enzymatic degradation, 1,950,000 units of streptokinase were found, corresponding to a yield of 39% of the quantity used at the beginning.

For removing the papain, the enzyme degraded product was subjected to chromatography on DEAE-cellulose.

For this, purpose, DEAE-cellulose was equilibrated with a 0.06 molar phosphate buffer having a pH-value of 5.5 and covered with the enzyme solution. The active, split streptokinase product was thereupon adsorbed. The unspecific proteins and the inactive degradation products run through the column (in the batch process they remain in the supernatant). After elution with a 0.15 molar phosphate buffer having a pH-value of 5.5, the streptokinase preparation having reduced antigenicity was recovered from the eluate.

In physico-chemical analysis and in the test for antigenicity, the product obtained by the treatment with papain demonstrated practically the same properties as the products obtained by treatment with pepsin or thrombin.

*Example 4.—Treatment with plasmin*

This enzymatic degradation was carried out with plasminogen; plasminogen is a pre-stage of plasmin and is converted by streptokinase into plasmin. The plasmin thus formed then splits the streptokinase.

1 ml. of a plasminogen solution containing a total of 20,000 units of purified plasminogen were added to 10 ml. of a streptokinase solution containing a total of $1.5 \cdot 10^6$ Christensen units of streptokinase; the resulting solution was incubated for 30 minutes at a pH-value of 7.0 and at 20° C. The yield after the plasmin action was 629,000 units of streptokinase equal to 42% of the quantity used at the beginning.

In order to remove the plasmin, the streptokinase preparation obtained by the treatment with plasmin was thereafter purified on DEAE-cellulose as described in Example 3. Physico-chemical analysis and the test for antigenicity showed this preparation to have similar properties to the degradation products obtained by treatment with pepsin, thrombin or papain.

We claim:
1. A process for preparing a streptokinase preparation having reduced antigenicity, which comprises bringing into contact with streptokinase a proteolytic enzyme and isolating the formed streptokinase preparation.

2. A process for preparing a streptokinase preparation having reduced antigenicity, which comprises bringing into contact with streptokinase a proteolytic enzyme selected from the group consisting of pepsin, thrombin, papin, and plasmin, and isolating the formed streptokinase preparation.

3. A process for preparing a streptokinase preparation having reduced antigenicity, which comprises bringing into contact with streptokinase a proteolytic enzyme and isolating by dialysis the formed streptokinase preparation.

4. A process for preparing a streptokinase preparation having reduced antigenicity, which comprises bringing into contact with streptokinase a proteolytic enzyme and isolating by precipitation with alcohol the formed steptokinase preparation.

5. A process for preparing a streptokinase preparation having reduced antigenicity, which comprises bringing into contact with streptokinase a proteolytic enzyme and isolating by precipitation with ammonium sulfate the formed streptokinase preparation.

6. A process for preparing a streptokinase preparation having reduced antigenicity, which comprises bringing into contact with streptokinase a proteolytic enzyme and isolating by chromatography the formed streptokinase preparation.

7. A streptokinase preparation having reduced antigenicity prepared according to the process of claim 2 wherein the streptokinase is brought into contact with the enzyme at a pH between 5 and 8 from half hour to 5 hours at a temperature between 10° to 40° C.

References Cited
UNITED STATES PATENTS

| | | | |
|---|---|---|---|
| 3,016,337 | 1/1962 | Singher et al. | 195—66 |
| 3,107,203 | 10/1963 | Baumgarten et al. | 195—66 |
| 3,226,304 | 12/1965 | Siiteri et al. | 195—62 |

A. LOUIS MONACELL, *Primary Examiner.*

L. M. SHAPIRO, *Examiner.*